(12) United States Patent
Contreras et al.

(10) Patent No.: US 8,393,073 B2
(45) Date of Patent: Mar. 12, 2013

(54) METHOD TO CONTROL MASK PROFILE FOR READ SENSOR DEFINITION

(75) Inventors: Richard Jule Contreras, San Jose, CA (US); Michael Feldbaum, San Jose, CA (US); Mustafa Michael Pinarbasi, Morgan Hill, CA (US)

(73) Assignee: HGST Netherlands B.V., Amsterdam (NL)

( * ) Notice: Subject to any disclaimer, the term of this patent is extended or adjusted under 35 U.S.C. 154(b) by 528 days.

(21) Appl. No.: 12/177,069

(22) Filed: Jul. 21, 2008

(65) Prior Publication Data

US 2009/0007416 A1 Jan. 8, 2009

Related U.S. Application Data

(63) Continuation of application No. 11/046,421, filed on Jan. 28, 2005, now abandoned, and a continuation-in-part of application No. 11/035,771, filed on Jan. 14, 2005, now abandoned.

(51) Int. Cl.
*G11B 5/187* (2006.01)
*C23F 1/12* (2006.01)

(52) U.S. Cl. ............... 29/603.12; 29/603.14; 29/603.15; 29/603.16; 29/603.18; 216/22; 216/48; 216/67; 430/313; 360/324; 360/327; 315/111.21

(58) Field of Classification Search .. 29/603.12–603.16, 29/603.18; 216/22, 42, 48, 67; 430/313; 438/778; 360/317, 327, 324, 324.1, 324.2; 315/111.21, 111.81
See application file for complete search history.

(56) References Cited

U.S. PATENT DOCUMENTS

| | | | | |
|---|---|---|---|---|
| 5,605,599 A * | 2/1997 | Benzing et al. | ............... | 438/778 |
| 5,994,234 A | 11/1999 | Ouchi | ........................... | 438/719 |
| 6,225,744 B1 * | 5/2001 | Tobin et al. | .............. | 315/111.21 |
| 6,541,361 B2 * | 4/2003 | Ko et al. | ........................ | 430/313 |
| 6,547,977 B1 * | 4/2003 | Yan et al. | ........................ | 216/67 |
| 6,700,759 B1 * | 3/2004 | Knapp et al. | ................ | 360/324.2 |
| 2002/0084243 A1 * | 7/2002 | Hsiao et al. | ..................... | 216/22 |
| 2004/0027730 A1 * | 2/2004 | Lille | ........................... | 29/603.15 |
| 2004/0109265 A1 | 6/2004 | Gill | ........................... | 360/324.12 |

FOREIGN PATENT DOCUMENTS

| | | |
|---|---|---|
| CN | 1185029 | 6/1998 |
| CN | 1204864 | 1/1999 |
| CN | 1506940 | 6/2004 |
| EP | 1079785 | 5/1999 |
| JP | 2003132509 A * | 5/2003 |

* cited by examiner

*Primary Examiner* — A. Dexter Tugbang
(74) *Attorney, Agent, or Firm* — Zilka-Kotab, PC

(57) ABSTRACT

A method for constructing a magnetoresistive sensor that avoids shadowing effects of a mask structure during sensor definition. The method includes the use of an antireflective coating (ARC) and a photosensitive mask deposited there over. The photosensitive mask is formed to cover a desired sensor area, leaving non-sensor areas exposed. A reactive ion etch is performed to transfer the pattern of the photosensitive mask onto the underlying ARC layer. The reactive ion etch (RIE) is performed with a relatively high amount of platen power. The higher platen power increases ion bombardment of the wafer, thereby increasing the physical (ie mechanical) component of material removal relative to the chemical component. This increase in the physical component of material removal result in an increased rate of removal of the photosensitive mask material relative to the ion mill resistant mask. This avoids the formation of a bulbous or mushroom shaped photoresist mask and therefore, avoids shadowing effects during subsequent manufacturing processes.

12 Claims, 11 Drawing Sheets

METHOD TO CONTROL MASK PROFILE FOR READ SENSOR DEFINITION

RELATED APPLICATIONS

This Application is a Continuation Application of U.S. patent application Ser. No. 11/046,421, entitled METHOD TO CONTROL MASK PROFILE FOR READ SENSOR DEFINITION filed on Jan. 28, 2005 now abandoned to common inventors, which is incorporated herein by reference in its entirety as if fully set forth herein.

This Application is also a Continuation In Part Application of U.S. patent application Ser. No. 11/035,771, entitled MAGNETORESISTIVE SENSOR HAVING A NOVEL JUNCTION STRUCTURE FOR IMPROVED TRACK WIDTH DEFINITION AND PINNED LAYER STABILITY, filed on Jan. 14, 2005 now abandoned to common inventors, which is incorporated herein by reference as if fully set forth herein.

FIELD OF THE INVENTION

The present invention relates to the manufacture of magnetoresitive sensors and more particularly to a method for accurately defining the side walls and track width of a magnetoresistive sensor.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, a thin layer of air develops between the slider and the rotating disk. When the slider rides on this air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos $\Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP spin valve includes first and second magnetic layers separated by a thin non-magnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

Traditionally, GMR sensors have been constructed as current in plane (CIP) GMR sensors, wherein current flows through the sensor from one side to the other in a direction parallel with the planes of the layers making up the sensor. More recently, increased attention has been focused on current perpendicular to plane (CPP) GMR sensors. As its name suggests, in a CPP sensor, current flows through the sensor from top to bottom in a direction perpendicular to the planes of the layers making up the sensor.

Another type of magenetoresistive sensor is a tunnel junction sensor (TMR) or tunnel valve. A tunnel valve includes a pinned layer and a free layer, similar to a GMR sensor. However, instead of having a non-magnetic electrically conductive spacer layer between the free and pinned layers, a tunnel valve has a thin dielectric, non-magnetic barrier layer, which can be constructed of for example alumina $Al_2O_3$. A tunnel valve operates based on the spin dependent scattering of electrons through the thin barrier layer. When the magnetic moments of the free and the pinned layer are aligned parallel with one another, electrons much more readily pass through the barrier layer than when they are the moments are antiparallel. Therefore, current travels through a tunnel valve in a direction perpendicular to the plane of the layers making up the sensor, similar to a current perpendicular to plane (CPP) GMR.

With reference to FIG. 1A, magnetoresitive sensors have traditionally been constructed by a method that includes first depositing the sensor layers 102 as full film layers, on a substrate 104, which can be for example an alumina gap layer, or in the case of a CPP GMR or tunnel valve could be an electrically conductive magnetic material such as NiFe. Then, a full film layer of material that is resistant to chemical mechanical polishing (CMP stop) 106 is deposited. A layer 108 of antireflective coating (ARC) material, such as Duramide, that is resistant to removal by ion milling is then deposited over the CMP resistant material 106. A mask 110 that includes one or more layers of a photoreactive material such as photoresist is then formed to cover the area where the sensor is desired and exposing other portions. A reactive etching process is then used to remove the ARC and CMP resistant materials.

With reference now to FIG. 1B, a reactive ion etch 112 is then performed to remove portions of the ion mill resistant layer 108 and CMP stop 106 that are not covered by the photoresist mask 110. This process is known in the industry as transferring the image of the photoresist mask 110 onto the underlying mask layers 106, 108. The RIE process used to transfer the image of the photoresist mask onto the underlying layers 106, 108 is chosen to be a RIE process that can readily remove the materials making up the underlying layers 106, 108.

With reference to FIG. 1B, it can be seen that, since the RIE process used to perform the image transfer preferentially removes the layer 108 at a faster rate than it removes the photoresist layer 110, a bulbous or mushroom shape forms on the mask layers 106, 108, 110. Sensor performance depends, to large extent on the clean and precise definition of the sensor by the ion mill process. For example, the trackwidth of the sensor is determined by this ion milling procedure, so accurate location of the side walls is critical. In addition, accurate definition of the trackwidth depends upon having a sharp sensor edge that is as close to vertical as possible. A sloping sensor side wall results in a poorly defined trackwidth. Furthermore, a clean vertical side wall is necessary for efficient free layer biasing, since the hard bias layers will abut this side wall.

Unfortunately, the bulbous mask structure prevents clean, accurate sensor definition. For example, the bulbous mask structure results in shadowing during the image transfer process and during the sensor defining ion mill process. In addition, the bulbous mask shape result in non-uniform deposition of layers such as hard bias layers and lead layers.

Therefore, there is a strong felt need for a method for defining the track width and stripe height of a magnetoresistive sensor that overcomes the shadowing problems resulting from the bulbous mask structure described above. Such a method would preferably not result in significant added expense or process time and would preferably incorporate already implemented manufacturing processes.

SUMMARY OF THE INVENTION

The present invention provides a method for manufacturing a sensor in which the precision of the sensor definition is not diminished by shadowing effects. The method involves depositing a series of sensor layers as full film layers onto a substrate. A CMP stop layer can then be deposited over the sensor layers, followed by an antireflective coating layer (ARC). Then a photosensitive mask is formed over the ion mill resistant mask layer. A reactive ion etch is then performed to remove exposed portions of the underlying ion mill resistant mask and the CMP stop. The reactive ion etch is performed while applying a platen power greater than a 70 Watts (W), and preferably of at least 100 Watts (W). More preferably, the reactive ion etch is performed while applying a platen power of around 300 W. The application of this higher platen power increases the physical component of material removal, increasing the rate at which the photoresist mask material is removed, thereby eliminating the formation a bulbous or mushroom shaped mask layer and eliminating any shadowing effects resulting therefrom.

After the reactive ion etch RIE has been performed an ion mill may be performed to define the sensor. Then a layer of hard magnetic material such as CoPtCr and a layer of electrically conductive material such as Ta or Rh or some other material can be deposited to form the hard bias layers and seeds. A CMP process may then be performed to remove the mill resistant mask.

The platen power applied during the reactive ion etch REI can be 70 W to 500 W. More preferably, the power applied during the reactive ion etch is between 250 W and 350 W or about 300 W.

The inventive method of constructing a sensor advantageously avoids the formation of a bulbous or mushroom shaped mask layer, thereby preventing the shadowing effects ordinarily associated with the use of a photoresisist mask formed over an ion mill resistant mask.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

BEST MODE FOR CARRYING OUT THE INVENTION

The following description is of the best embodiments presently contemplated for carrying out this invention. This description is made for the purpose of illustrating the general principles of this invention and is not meant to limit the inventive concepts claimed herein.

Figure 1A:
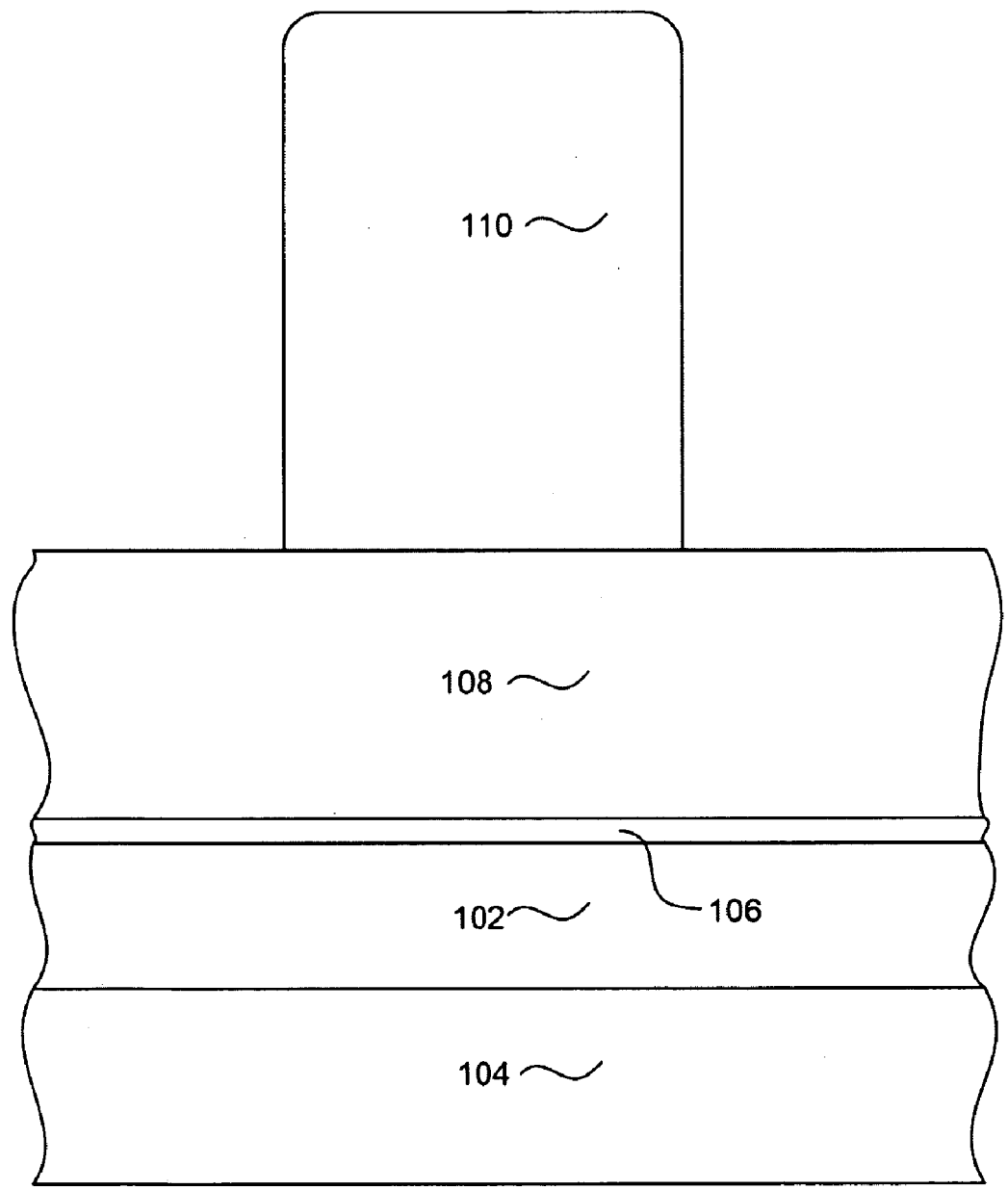
FIGS. 1A and 1B show a read sensor in intermediate stages of manufacture to illustrate a prior art method for manufacturing a magnetoresistive sensor.
Figure 1B:
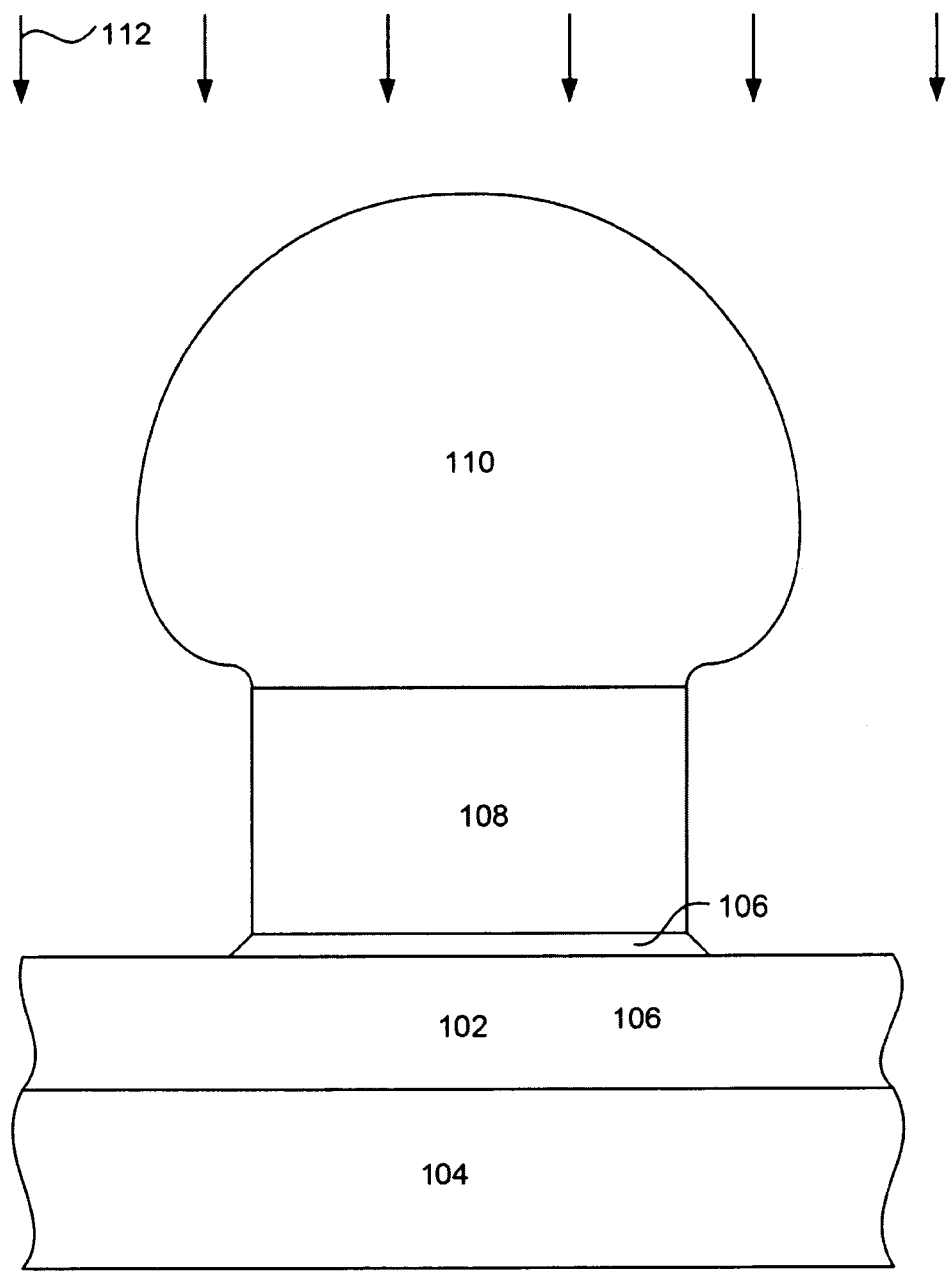
Figure 2:
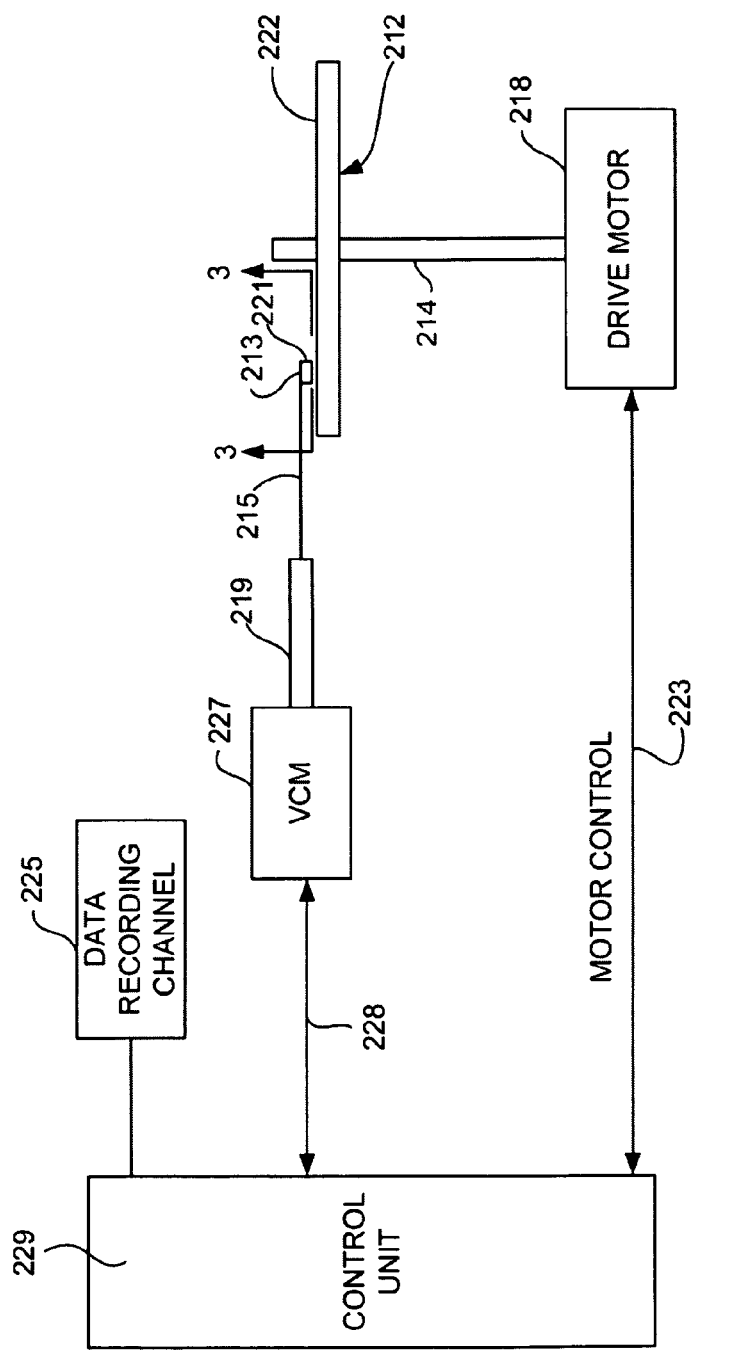
FIG. 2 is a schematic illustration of a disk drive system in which the invention might be embodied.

Referring now to FIG. 2, there is shown a disk drive 200 embodying this invention. As shown in FIG. 2, at least one rotatable magnetic disk 212 is supported on a spindle 214 and rotated by a disk drive motor 218. The magnetic recording on each disk is in the form of annular patterns of concentric data tracks (not shown) on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215. The suspension 215 provides a slight spring force which biases slider 213 against the disk surface 222. Each actuator arm 219 is attached to an actuator means 227. The actuator means 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of the magnetic disk 212 generates an air bearing between the slider 213 and the disk surface 222 which exerts an upward force or lift on the slider. The air bearing thus counter-balances the slight spring force of suspension 215 and supports slider 213 off and slightly above the disk surface by a small, substantially constant spacing during normal operation.

The various components of the disk storage system are controlled in operation by control signals generated by control unit 229, such as access control signals and internal clock signals. Typically, the control unit 229 comprises logic control circuits, storage means and a microprocessor. The control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
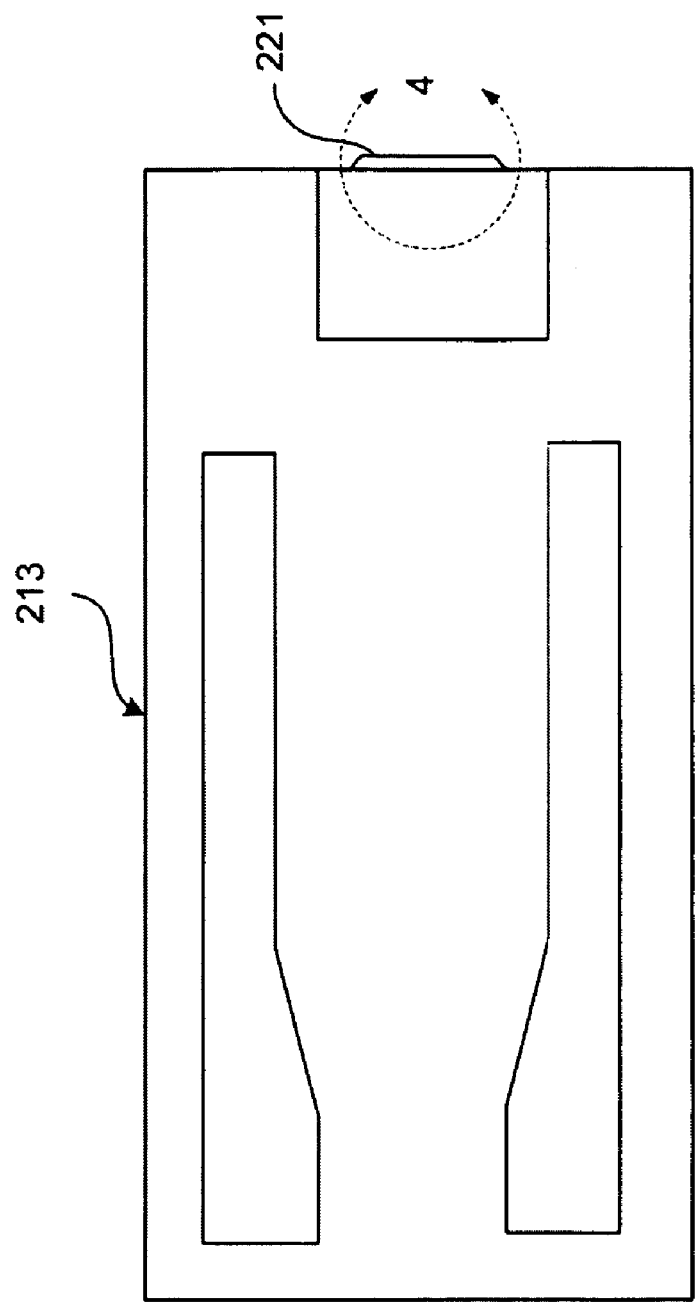
FIG. 3 is an ABS view of a slider illustrating the location of a magnetic head thereon.

With reference to FIG. 3, the orientation of the magnetic head 221 in a slider 213 can be seen in more detail. FIG. 3 is an ABS view of the slider 213, and as can be seen the magnetic head including an inductive write head and a read sensor, is located at a trailing edge of the slider. The above description of a typical magnetic disk storage system, and the accompanying illustration of FIG. 2 are for representation purposes only. It should be apparent that disk storage systems may contain a large number of disks and actuators, and each actuator may support a number of sliders.

Figure 4:
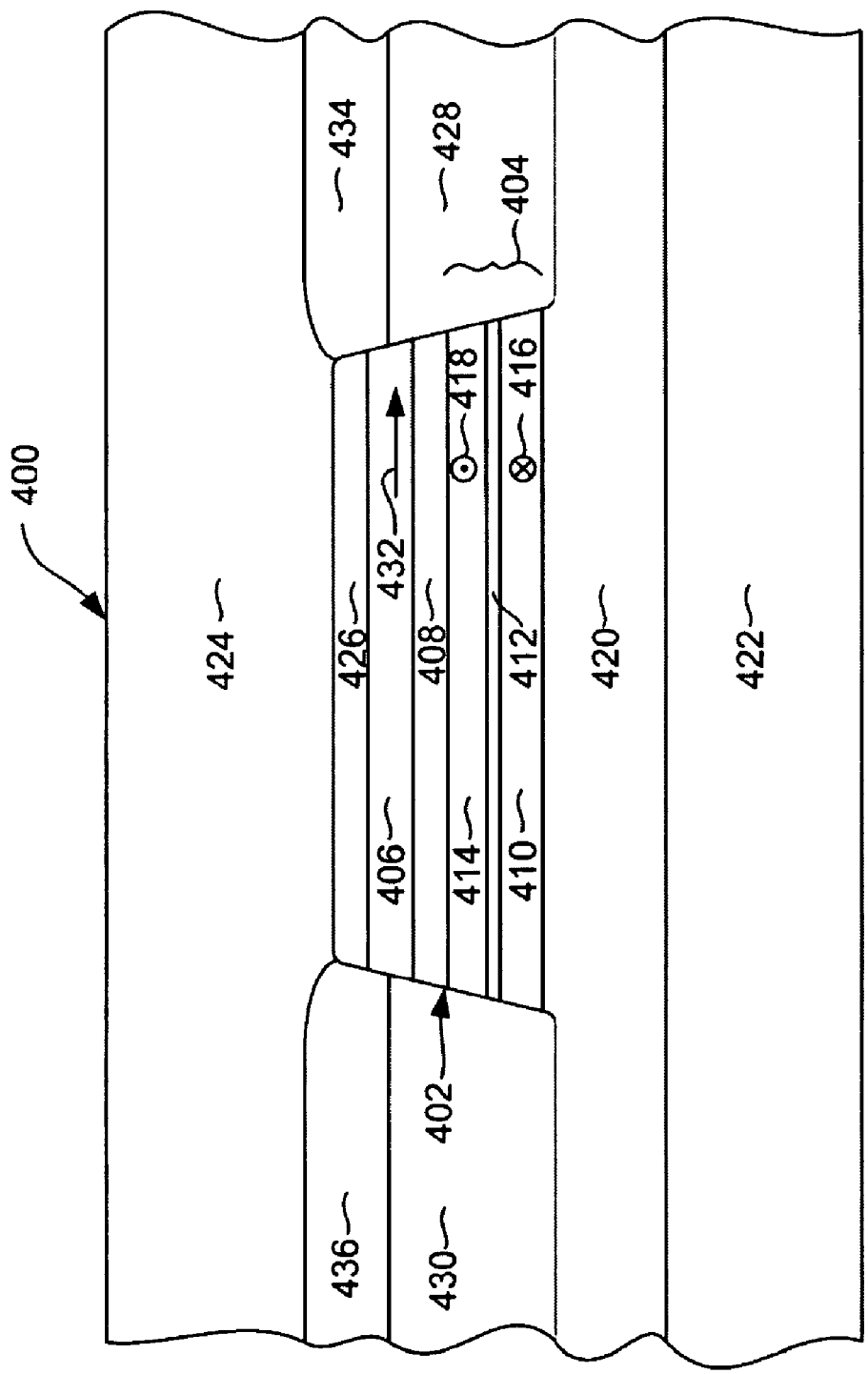
FIG. 4 is an ABS view of a magnetic sensor according to an embodiment of the present invention taken from circle 4 of FIG. 3 and rotated 90 degrees counterclockwise.

With reference now to FIG. 4, a magnetoresistive sensor 400 according to an embodiment of the invention includes a sensor stack 402. The sensor stack includes a magnetically pinned layer 404, a magnetically free layer 406 and a non-magnetic, electrically conductive spacer layer 408 sandwiched there between. It should be pointed out that although the sensor is being described in terms of a GMR sensor, it could also be a tunnel valve (TMR) sensor, in which case the spacer layer 408 would be a non-magnetic, electrically insulating material such as alumina ($Al_2O_3$).

The pinned layer 404, may be one of several types of pinned layers, such as a simple pinned, AP pinned, self pinned or AFM pinned sensor. For purposes of simplicity, the sensor will be described herein as an AP pinned, AFM pinned sensor having an AP1 layer 410, AP2 layer 414, and a non-magnetic, AP coupling layer, such as Ru 412 sandwiched there between.

The AP1 and AP2 layers 410, 414 can be constructed of several magnetic materials such as, for example NiFe or CoFe, and have magnetic moments 416, 418 that are pinned by exchange coupling of the AP1 layer 410 with a layer of antiferromagnetic material (AFM layer) 420 such as PtMn.

The sensor stack 402 is sandwiched between first and second non-magnetic, electrically insulating gap layers 422, 424, and may include a cap layer 426, such as Ta, to protect the sensor stack 402 from damage during manufacturing. First and second hard bias layers 428, 430 extend laterally from the sides of the sensor and magnetostatically couple with the free layer 406 to bias the magnetic moment 432 of the free layer in a desired direction parallel with the ABS. First and second electrically conductive leads 434, 436 are provided above the hard bias layers to provide a sense current to the sensor 400.

Figure 5:
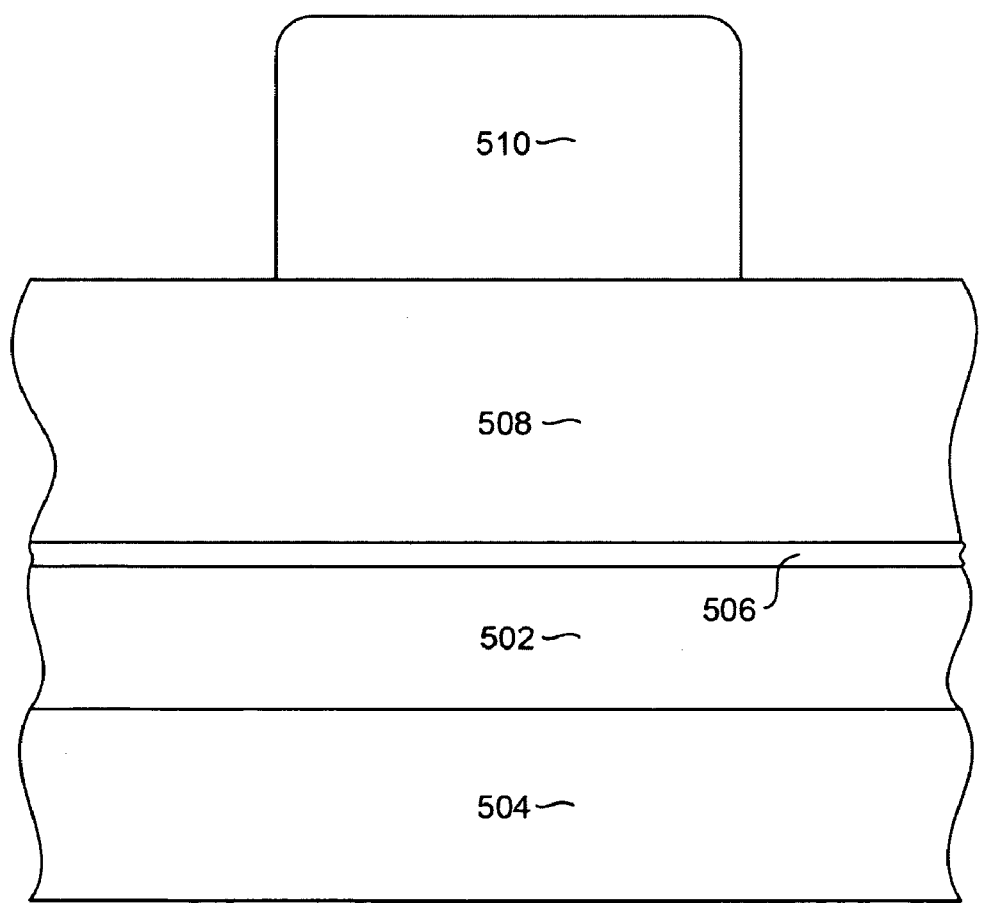
FIGS. 5-9 are ABS views of a magnetoresitive sensor in various intermediate stages of manufacture.
Figure 6:
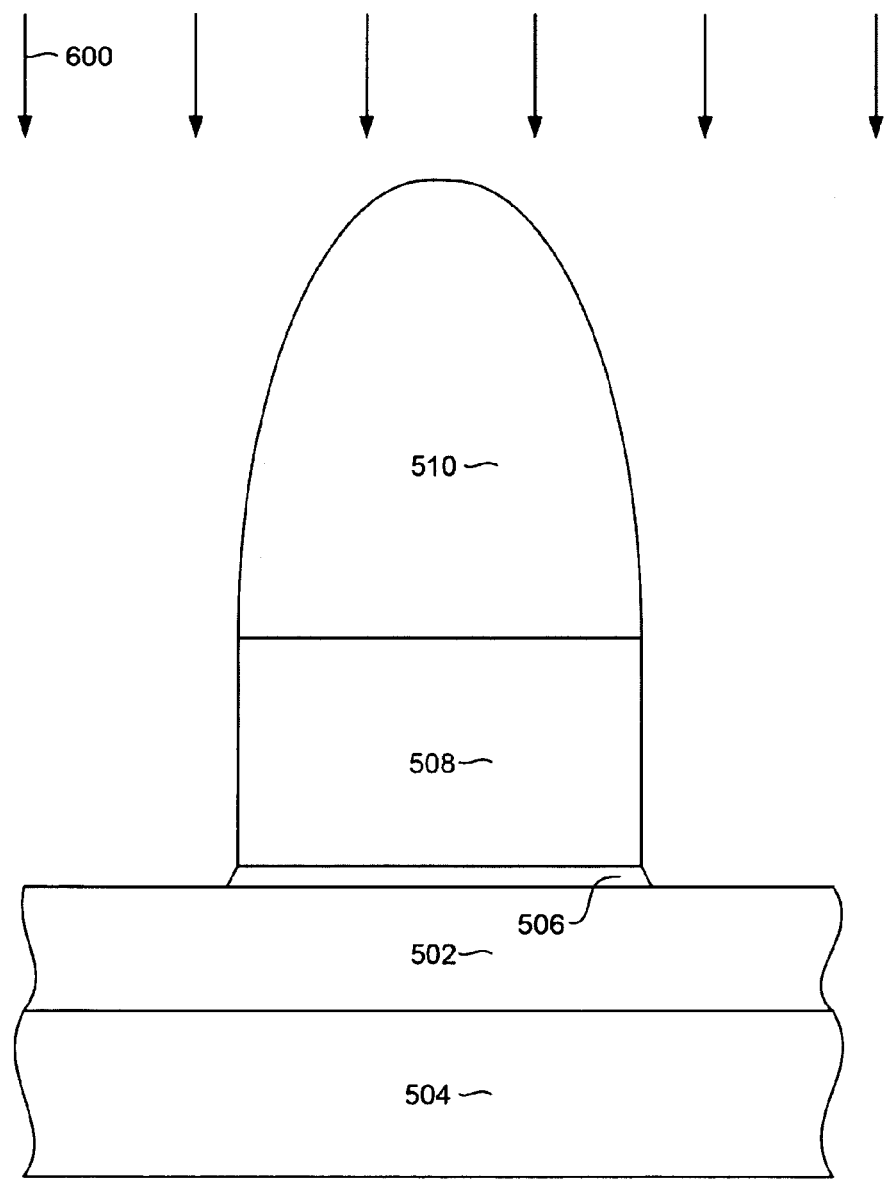
Figure 7:
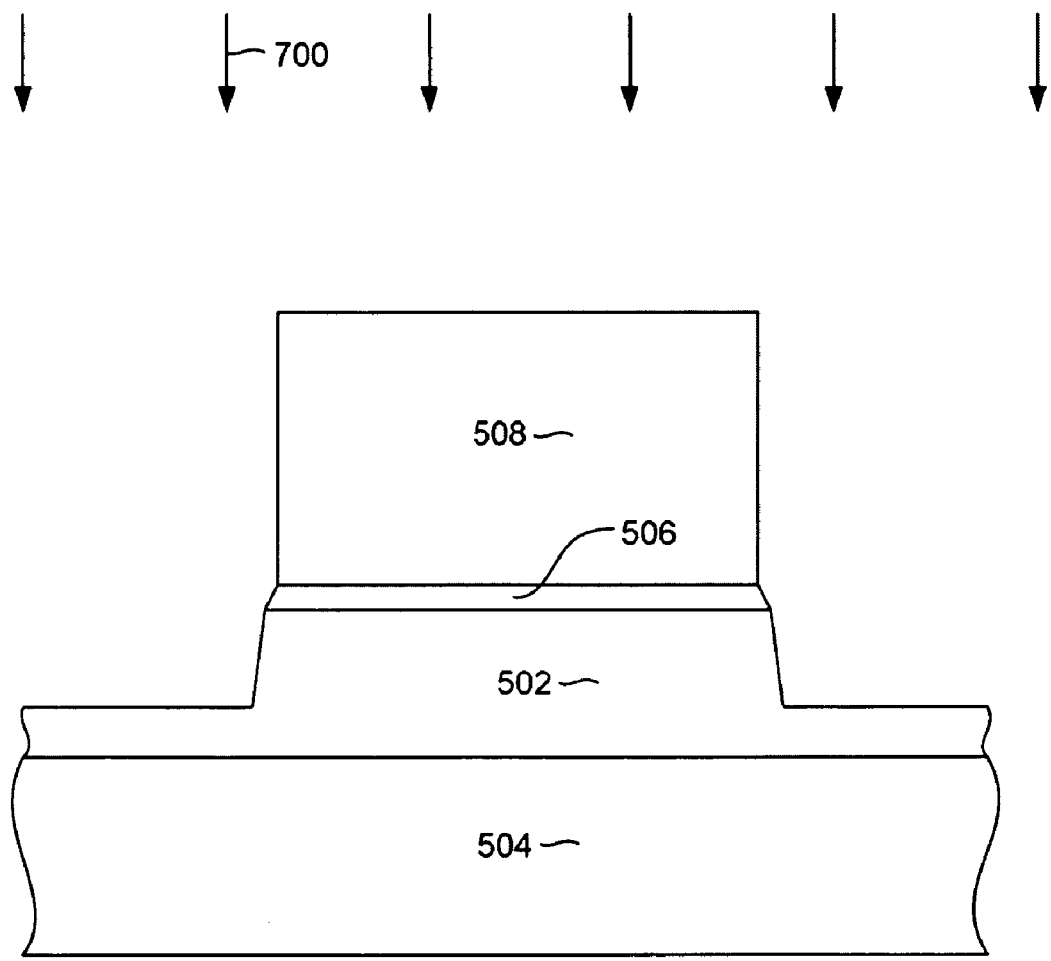

With reference now to FIGS. 5-7, a method for manufacturing the sensor 400 will be described. More particularly, the method is for defining the width and stripe height of the sensor and defines the sensor with desired clean, vertical, well defined side walls. With particular reference to FIG. 5, a series of sensor layers 502 are deposited on a substrate 504, such as a non-magnetic, electrically insulating gap layer. The sensor layers 502 include full film layers of material that will make up the AFM 420, pinned layer 404 space 408, free layer 406 and cap layer 426, previously described with reference to FIG. 4. Other layers may be includes as well.

With reference to FIG. 5, a layer of material that is resistant to chemical mechanical polishing (CMP stop layer) 506 may be deposited on the sensor layers. The CMP stop layer 506 may be, for example, diamond like carbon (DLC) or some other material. Then, a layer of antireflective coating material (ARC) 508 is deposited. Preferably the layer 508 is a material such as Duramide, which is resistant to removal by ion milling. The layer 508 can also be for example, hard baked photoresist. Then, a layer of photoreactive material or TIS such as photoresist 510 is spun onto the layer 510 and is photlithographically patterned to form a sensor mask 510. The mask 510 covers an area that will become the sensor stack 502 (FIG. 4), and leaves other areas uncovered.

With reference now to FIG. 6 a reactive ion etch (RIE) 600 is performed to transfer pattern of the mask onto the underlying layers 508, 506. REI processes include both a chemical component and a mechanical or physical component to their total material removal performance. A RIE process is performed in a plasma chamber in an atmosphere that may contain a gas such as $O_2$ or $CO_2$ preferably $O_2$. Power is applied to the gas to strike a plasma in the chamber and a bias voltage is applied to a chuck holding the workpiece, in order to bias ions toward the workpiece. Bombardment of ions against the workpiece results in the removal of material from the workpiece. The strength of this ion bombardment determines the physical component of the material removal. A chemical reaction of the plasma or other gasses in the chamber causes a chemical component of the material removal.

For purposes of the present invention, the RIE 600 is performed in a chamber with an $O_2$ gas plasma. As discussed in the Background of the Invention, prior art RIE processes have removed the mill resistant layer 508 at a faster rate than the photoresist mask 510. We have found that this is because the chemical component of the material removal preferentially attacks the mill resistant layer 508 more readily than the photoresist layer 510. According to the present invention, the RIE 600 is performed with an increased physical component to increase the ratio of photoresist 510 relative to the removal of mill resistant material 508.

An increase in the physical component of material removal can be achieved by increasing the bias voltage applied to the chuck on which the workpiece is held within the plasma chamber. This increased bias voltage causes the ions within the plasma to strike the workpiece with increased speed and, therefore, increased power. This bias voltage is determined by the platen power. The platen power is preferably at least 70 W and may be about from 70 W to 500 W. The platen power is more preferably 250 W to 350 W, or about 300 W.

The image transfer using the RIE process at the power settings described above results in the photoresist mask 510 having a conical shape as shown in FIG. 6, without any overhang or mushroom shape to the photoresist layer 510. This advantageously prevents shadowing during an ion mill process described below. Because the photoresist layer 510 does not have any overhang, the sensor can be accurately defined by the ion milling.

With reference now to FIG. 7, to define the sensor a material removal process 700, which is preferably an ion milling process is used to remove portions of the sensor layer 502. This ion milling process 700 can be performed sufficiently to remove all of the exposed portions of the sensor layer 502 such that the ion mill extends down into the gap layer 504. Preferably, however, the ion mill process terminates at some point within the level of the sensor layers 502, such as within the AFM layer 420 (FIG. 4). Such termination of the ion milling operation with the sensor layers 502 can be called a partial mill process. The ion milling operation removes most or all of the photoresist mask 510, leaving the ion mill resistant mask 508 and CMP stop layer 506 relatively intact.

Figure 8:
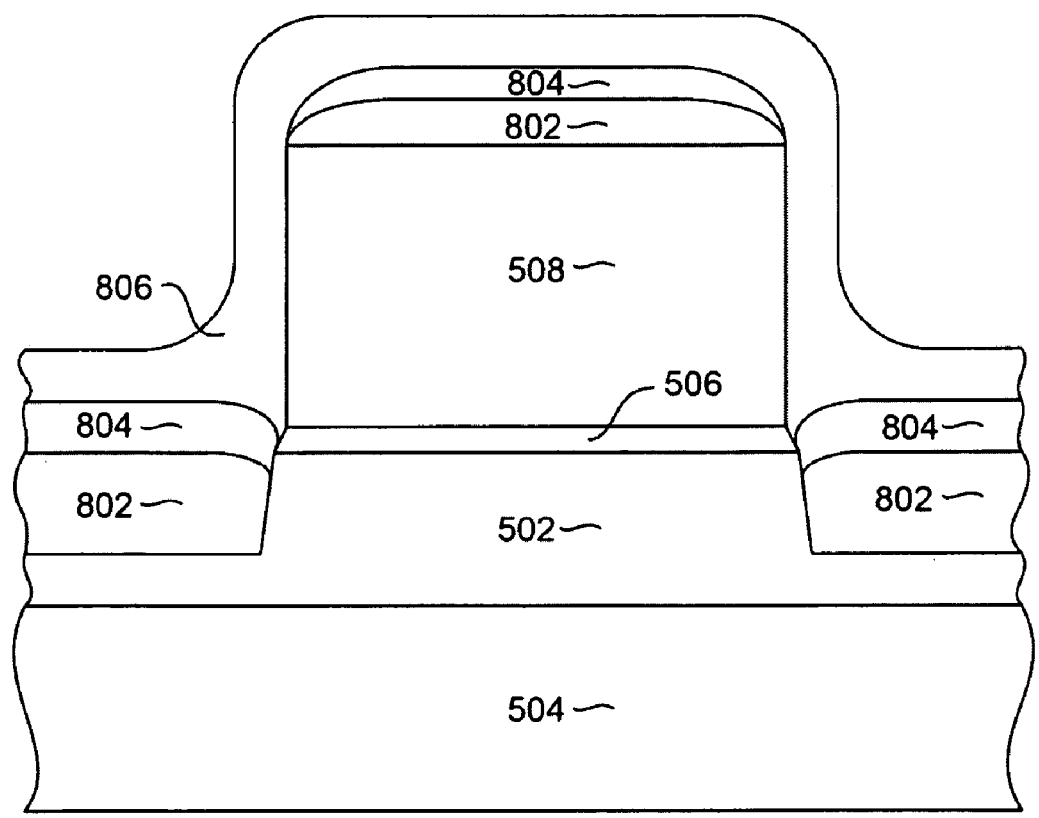

With reference to FIG. 8, a layer of hard magnetic material 802 may be deposited full film to provide the hard bias layers 428, 430 (FIG. 4) in the finished sensor 400. One or more seed layers (not shown) may be deposited before depositing the hard magnetic material. Such seed layers may include Cr, CrMo, Si, NiTa The hard magnetic material 802, may be, for example, CoPtCr, or some other magnetic material having a high coercivity (Hc).

Figure 9:
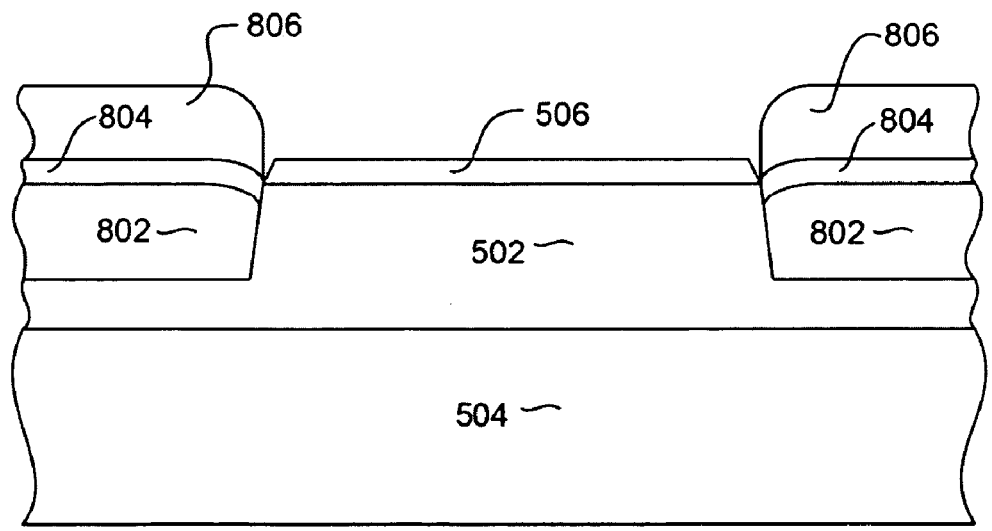

After the hard magnetic material 802 has been deposited, a layer of electrically conductive material 804, such as Cu, Au, Rh or Ta is deposited to provide material for the leads 434, 436 (FIG. 4). An additional CMP protection layer 806 such as DLC is deposited over the electrically conductive material. Thereafter, with reference to FIG. 9, a chemical mechanical polishing process (CMP) may be performed, to remove the mask 508 and to planarize the leads 804. The CMP stop layer 806 prevents the CMP process from damaging the leads 804. The first CMP protective layer 506 protects the sensor from damage during the CMP process. After the CMP process all remaining CMP protective material 806 and 506 are moved by a RIE process. Thereafter, a layer of non-magnetic, electrically insulating material, such as alumina may be deposited to form the second gap layer 424 (FIG. 4).

Figure 10:
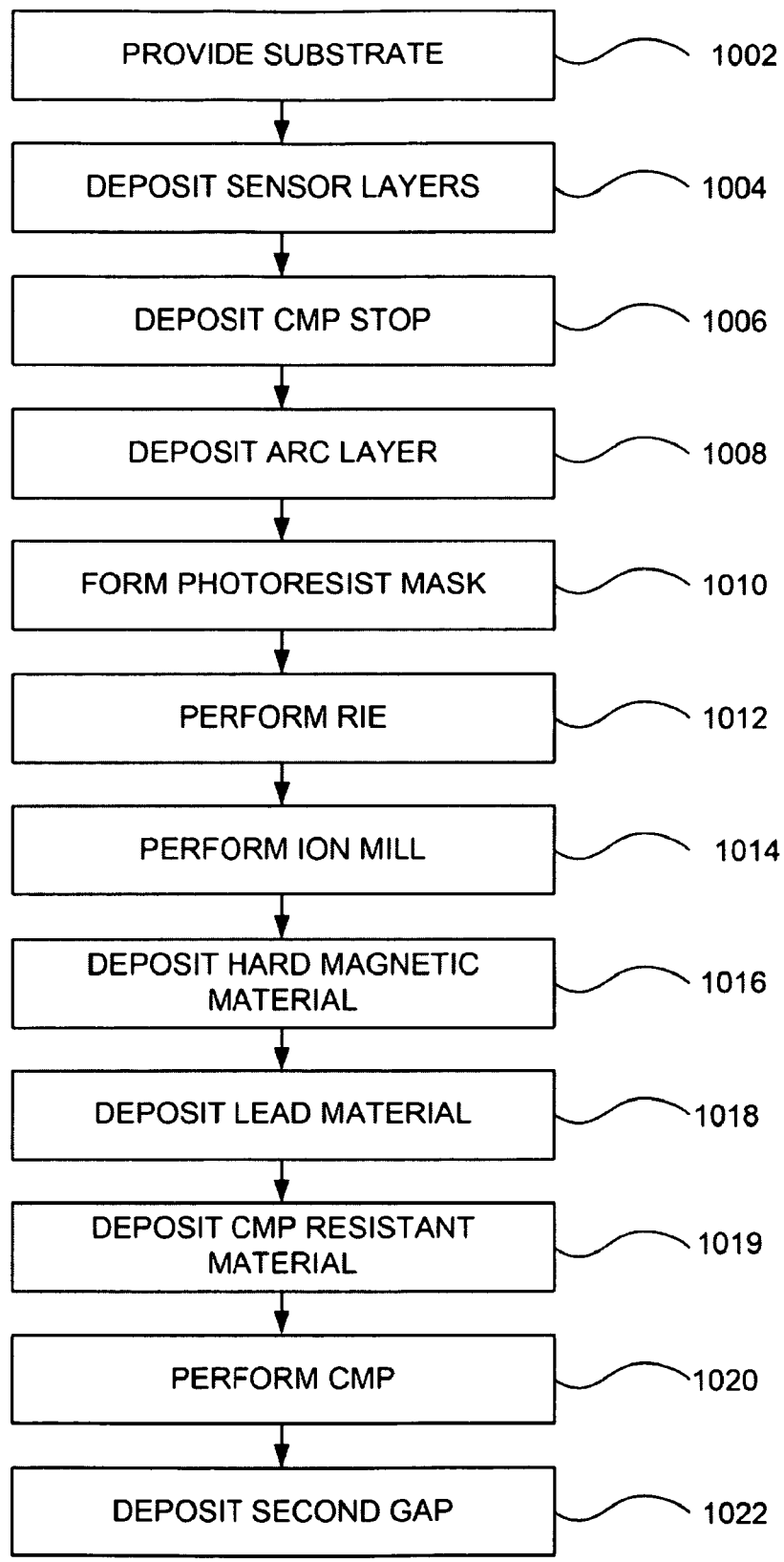
FIG. 10 is flowchart summarizing a method of manufacturing a magnetoresistive sensor according to an embodiment of the invention.

With reference to FIG. 10, a method for manufacturing a magnetoresistive sensor as described above will be summarized. In a step 1002 a substrate is provided. This substrate may be for example an alumina gap layer 504. Then, in a step, 1004, a series of sensor layers 502 are deposited full film. Thereafter, in a step 1006 a CMP stop layer 506 is deposited and in a step 1008 an ARC layer 508 is deposited. Then, in a step, 1010 a layer of photoresist material is spun on and is then photolithographically patterned to form a photoresist mask 510 covering a sensor area and leaving non-sensor areas uncovered. Thereafter, in a step 1012, a material removal process is performed, such as reactive ion etch (RIE). The RIE process 600 is performed with a relatively high platen power, or at least 70 W. The platen power may be from 70 W to 500 W and is preferably 250 W to 350 W or about 300 W. The RIE 600 results in a photoresist mask having a cone or domed shape, without any mushroom overhang.

With continued reference to FIG. 10, in a step 1014 an ion milling process 700 is performed to remove a desired amount of sensor material that is not covered by the mask 508 and CMP stop 506. Then, in a step 1016 a layer of hard magnetic material 802 is deposited, and in a step 1018 a layer of electrically conductive lead material 804 is deposited. In a step 1019 a layer of CMP resistant material such as diamond like Carbon DLC is deposited. Then, in a step 1020 a chemical mechanical polishing process (CMP) is performed to remove the remaining mill resistant mask 508, and to planarize the lead material layers 804. An optional second reactive ion etch process (RIE) may be performed to remove the CMP stop mask 506. Then, in a step 1022 a layer of non-magnetic, electrically insulating material such as alumina may be deposited to form the gap layer 424.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for manufacturing a magnetoresistive sensor, comprising:
    providing a substrate;
    depositing a plurality of sensor layers;
    depositing a CMP stop layer that is made of a material that is resistant to removal by chemical mechanical polishing (CMP);
    depositing an ion mill resistant mask layer;
    forming a photoresist mask on the ion mill resistant mask layer;
    performing a reactive ion etch (RIE) to remove portions of the ion mill resistant mask layer that are not covered by the photoresist mask, the RIE being performed in a plasma chamber having a platen, the performing the RIE further comprising applying a platen bias power greater than 250 W and no greater than 350 W;
    after performing the reactive ion etch, performing an ion mill; and
    after performing the ion mill, depositing a layer of magnetically hard material.

2. A method as in claim 1, wherein the CMP stop layer comprises diamond like carbon.

3. A method as in claim 1, wherein the ion mill resistant mask layer comprises an antireflective coating material (ARC).

4. A method as in claim 1 wherein the platen power applied to the platen is about 300 W.

5. A method as in claim 1 wherein the RIE is performed in a plasma chamber containing an O2 atmosphere.

6. A method as in claim 1, further comprising after depositing the magnetically hard material, depositing an electrically conductive lead material.

7. A method as in claim 1 further comprising, after depositing the layer of magnetically hard material:
    depositing an electrically conductive lead material; and
    performing a chemical mechanical polish (CMP).

8. A method as in claim 7 further comprising after performing the CMP, depositing a layer of non-magnetic, electrically insulating material.

9. A method as in claim 1 further comprising:
before depositing the layer of magnetically hard material, depositing a seed layer;
after depositing the layer of magnetically hard material, depositing a layer of non-magnetic, electrically conductive lead material;
performing a chemical mechanical polish; and
depositing a layer of non-magnetic, electrically insulating gap material.

10. A method as in claim 9, wherein the non-magnetic, electrically conductive lead material comprises Rh.

11. A method as in claim 9, wherein the non-magnetic, electrically conductive lead material comprises Ta.

12. A method as in claim 9, wherein the non-magnetic, electrically conductive lead material comprises Au.

\* \* \* \* \*